(12) United States Patent
Lindgren et al.

(10) Patent No.: US 9,932,505 B2
(45) Date of Patent: Apr. 3, 2018

(54) HYDROCARBON BASED REFRIGERANT

(71) Applicant: GLANT, LLC, Brooklyn, NY (US)

(72) Inventors: Gary Michael Lindgren, Post Falls, ID (US); Frank Galante, Long Beach, NY (US)

(73) Assignee: GLANT, LLC, Brooklyn, NY (US)

( * ) Notice: Subject to any disclaimer, the term of this patent is extended or adjusted under 35 U.S.C. 154(b) by 0 days.

(21) Appl. No.: 15/336,151

(22) Filed: Oct. 27, 2016

(65) Prior Publication Data

US 2017/0044412 A1 Feb. 16, 2017

Related U.S. Application Data

(62) Division of application No. 14/410,163, filed as application No. PCT/US2013/047879 on Jun. 26, 2013, now abandoned.

(60) Provisional application No. 61/665,006, filed on Jun. 27, 2012.

(51) Int. Cl.
*C09K 5/04* (2006.01)
*F25B 45/00* (2006.01)

(52) U.S. Cl.
CPC ............. *C09K 5/042* (2013.01); *F25B 45/00* (2013.01); *C09K 2205/12* (2013.01); *C09K 2205/43* (2013.01); *F25B 2400/12* (2013.01)

(58) Field of Classification Search
CPC ..... C09K 2205/12; C09K 5/042; C09K 5/041
See application file for complete search history.

(56) References Cited

U.S. PATENT DOCUMENTS

| | | | |
|---|---|---|---|
| 6,327,866 B1 * | 12/2001 | Novak | C09K 5/042 252/67 |
| 7,771,610 B2 | 8/2010 | Roberts et al. | |
| 2004/0021124 A1 | 2/2004 | Cho | |
| 2009/0261289 A1 | 10/2009 | Ham | |
| 2012/0286193 A1 | 11/2012 | Maruya | |
| 2015/0115194 A1* | 4/2015 | Saito | C10M 169/04 252/68 |

* cited by examiner

*Primary Examiner* — John R Hardee
(74) *Attorney, Agent, or Firm* — Sorell Lenna & Schmidt, LLP

(57) ABSTRACT

An environmentally friendly hydrocarbon refrigerant mixture may be used as a substitute for existing refrigerant in a refrigerant system. The hydrocarbon refrigerant mixture offers greater operating efficiency and effectively replaces chlorofluorocarbon refrigerants. The refrigerant mixture for the refrigeration system includes from about 85% to about 89% by weight propane and from about 11% to about 15% by weight propene.

20 Claims, 1 Drawing Sheet

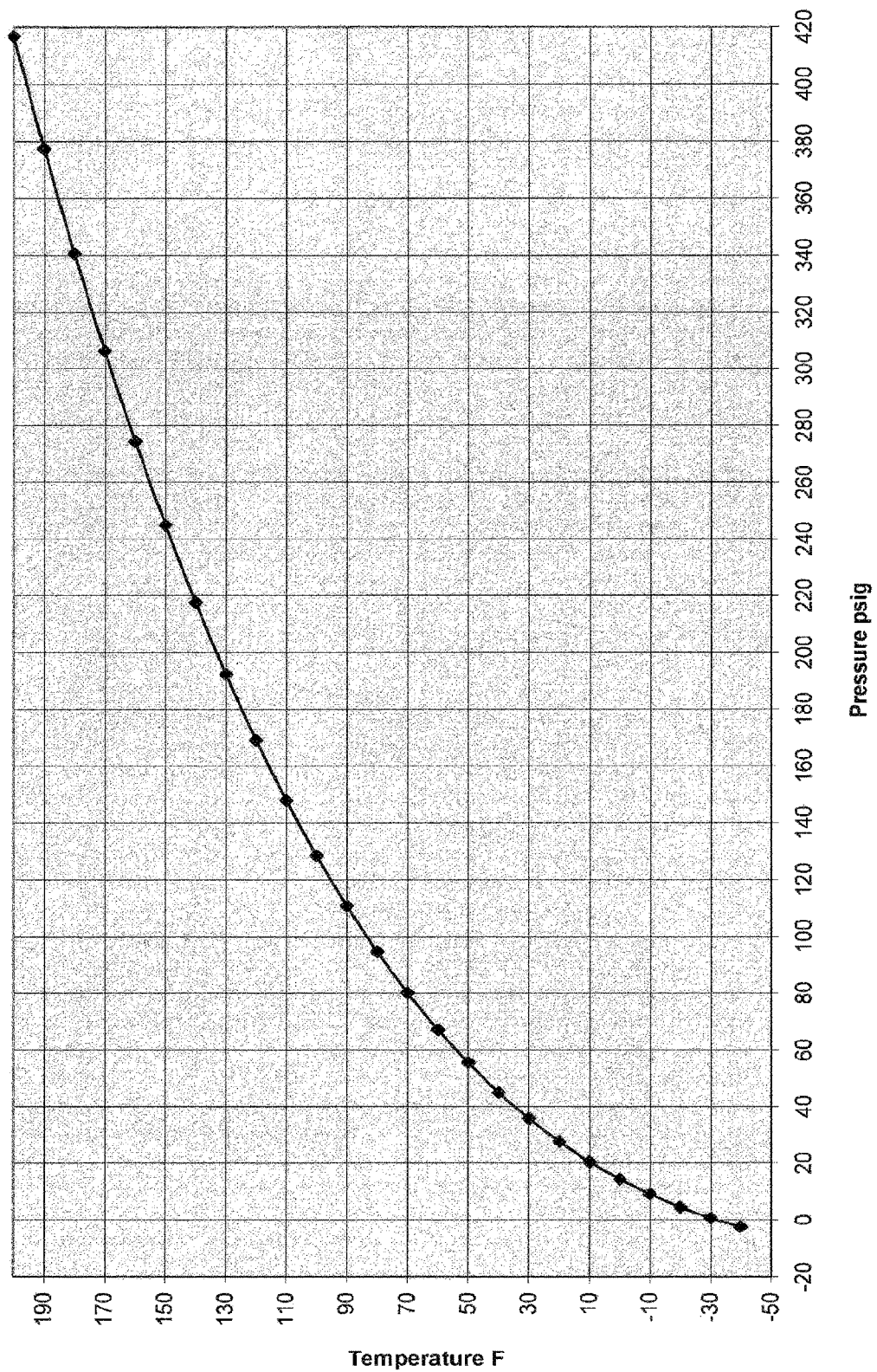

HYDROCARBON BASED REFRIGERANT

CROSS-REFERENCE TO RELATED APPLICATIONS

This application is a divisional application of U.S. patent application Ser. No. 14/410,163, filed Dec. 22, 2014, now abandoned, which claims the benefit of International Application No. PCT/US2013/047879 filed on Jun. 26, 2013, which claims benefit under 35 U.S.C. 119(e) of U.S. Provisional Application No. 61/665,006 filed on Jun. 27, 2012. These, applications are each incorporated herein by reference, in its entirety.

FIELD OF THE INVENTION

This invention relates to refrigerants, and more particularly, to a hydrocarbon refrigerant for use in a closed cycle refrigeration system.

BACKGROUND

Closed cycle refrigeration systems are well known and are typically used for household refrigeration, commercial refrigeration, freezer units, air conditioning units, heat pumps, and the like. Such systems use a refrigerant which can absorb surrounding heat while passing through an evaporator causing evaporation of the liquid refrigerant to a vapor. After the refrigerant has absorbed heat it is compressed thereby increasing its pressure. The high pressure fluid is passed through a condensing unit, typically located outside the refrigerated space. The heat in the refrigerant is given up to the surrounding, typically to the ambient air or to a liquid coolant. In the condenser, the refrigerant returns to its liquid state. It is then expanded through a throttle, valve or capillary tube to a low pressure fluid and is again sent into the refrigerating mechanism for absorbing heat.

In typical domestic refrigerators, the refrigerant temperatures in the evaporator are approximately 260° K. and the condensing temperature is approximately 300° K., which is slightly above ambient temperature. For freezing operations, the temperature may go a bit lower, and for air conditioning units, the temperature will be a bit higher. It should be understood, that reference to refrigeration in this application generally refers to such systems operating within the above general range of temperatures, including refrigeration, air conditioning and heat pumps, all of which are quite distinct from operating systems at cryogenic temperatures.

From a technical viewpoint, the refrigerant should have appropriate technical characteristics. For example, pressures under which it operates should be within a range of 1-20 atmospheres, and specifically, within the operation range of commercial refrigeration compressors. The high pressure boiling point should be approximately at ambient temperature. The low pressure dew point should be approximately at the freezing point of water. Additionally, in order to be effective, the refrigerant should be non-toxic, non-flammable, and relatively inexpensive.

A wide group of refrigerants have typically been utilized for such refrigeration systems. Many of these are made up of compounds containing one or more of the halogens, including fluorine, chlorine, iodine and bromine. Those containing both chlorine and fluorine are generally referred to as halogenated chlorofluorocarbons, or just chlorofluorocarbons (CFCs). One group of such CFC refrigerants is sold under the brand name Freon® which is a product of the DuPont Company. Various Freon formulations have been utilized, with each of these having differing temperature and pressure characteristics to conform to particular types of refrigeration systems. By way of example, Freon 12, also known as CFC-12 or R-12 (dichlorodifluoromethane) is a popular refrigerant in many refrigerator units. HFC-22, or R-22 is also a common refrigerant, and is chlorodifluoromethane. Additionally, R502 is commonly used, and is a mixture of R-22 (as defined above), and R-115, which is chloropentafluoroethane ($C_2F_5Cl$). However, there are questions as to the environmental safety of such CFC's.

Under the Montreal Protocol, as amended, United States laws (1990 Clean Air Act), and U.S. Environmental Protection Agency rules, the production and importing of R-12 ended on Dec. 31, 1995. Additionally, only 15% of the baseline amounts of chlorinated fluorocarbons (CFCs) were allowed to be produced or imported into the U.S. during the year 1995 adjusted on an ozone depletion factor basis. R-12 is the major share of that production.

With the effective date of the ban on U.S. R-12 production and importing having passed (Dec. 31, 1995), there has been and is still a need for an efficient replacement for CFC refrigerants with more favorable impact on the environment. Hydrocarbon/CFC blends have been proposed and used, as well as hydrocarbon mixtures.

Hydrocarbon mixtures used to date however, suffer from several drawbacks, minimizing their widespread usage. Propane/propylene mixtures have been used for systems that have excess vapor-handling capacity, can tolerate higher discharge pressures, and would benefit from cooler refrigerant temperatures. Most propane/propylene mixtures in use have greater than 50% propylene, and less than 50% propane.

United States Patent Publication No. 2009/0261289 to Ham et al. discloses both CFC/hydrocarbon blends, as well as exclusive hydrocarbon blends. The compositions of the Ham publication however, fail to disclose optimal pressure/temperature relationship, and suitable efficiencies. There remains a need, therefore, for an environmentally favorable hydrocarbon refrigerant with maximum efficiency as drop-in replacement for CFC refrigerants.

SUMMARY

The present invention includes a refrigerant mixture for a refrigeration system, the mixture including from about 85% to about 89% by weight propane and from about 11% to about 15% by weight propene. In a preferred embodiment, the refrigerant mixture includes from about 86% to about 88% propane by weight, and from about 12% to about 14% propene by weight. In a most preferred embodiment, the refrigerant mixture includes about 87% propane by weight and about 13% propene by weight.

The present invention also includes a method of retrofitting, or recharging a refrigeration system with a drop-in replacement refrigeration mixture, the drop-in refrigerant mixture including from about 85% to about 89% by weight propane and from about 11% to about 15% by weight propene. In another embodiment, the refrigeration system is designed to operate with halohydrocarbons, such as chlorofluorocarbon refrigerant. In an embodiment, the method of retrofitting includes replacing the halocarbon refrigerant with about 25% less of the hydrocarbon refrigerant mixture by weight, wherein the hydrocarbon refrigerant mixture replaces substantially all of the halocarbon refrigerant. In a preferred embodiment, the method of retrofitting includes replacing halocarbon refrigerant with about 40% less of the hydrocarbon refrigerant mixture, wherein the hydrocarbon refrigerant mixture replaces substantially all of the halocarbon refrigerant.

In these embodiments, the refrigeration system is first purged of a halocarbon, e.g., chlorofluorocarbon refrigerant, and the replacement hydrocarbon refrigerant mixture is charged into the refrigeration system. The halohydrocarbons which are purged are selected from the group consisting of dichlorodifluoromethane, chlorodifluoromethane, and a mixture of chlorodifluoromethane and chloropentafluoroethane.

In another preferred embodiment, the refrigerant mixtures of the present invention, when used in an air conditioning system, provide an increased moisture reduction in a target environment as compared to known refrigerants. In an embodiment, the refrigerant mixtures of the present invention provide an increased moisture reduction of about 20% as compared to a standard R22 refrigerant mixture. In a preferred embodiment, the mixtures provide about 25% greater moisture removal or reduction as compared to standard R22 refrigerant mixtures. In a preferred embodiment, the mixtures of the present invention provide about 30% greater moisture removal.

In another embodiment, the invention includes a retrofitting method which includes a system wide exhaust sufficient to ensure substantially instantaneous removal of hydrocarbon escape.

The present invention also includes a refrigerant mixture for a refrigeration system, the refrigerant mixture is formed of from about 45% to about 55% by weight propane, from about 5% to about 11% by weight propene, and greater than 36% butane. In a preferred embodiment, the refrigerant mixture is formed of from about 48% to about 53% propane by weight, from about 7% to about 10% propene by weight, and from about 37% to about 45% butane by weight. In a most preferred embodiment, the refrigerant mixture is formed of about 51% propane by weight, about 8% propene by weight, and about 41% butane by weight.

In another embodiment, the present invention includes a method of recharging a refrigeration system with a drop-in replacement refrigeration mixture, the drop-in mixture including from about 45% to about 55% by weight propane, from about 5% to about 11% by weight propene, and greater than about 36% butane by weight. In an embodiment, the refrigeration system is designed to operate with chlorofluorocarbon refrigerant. In another embodiment, the refrigeration system is purged of a chlorofluorocarbon refrigerant, and the drop-in replacement refrigerant mixture is changed, or inserted into said refrigeration system. In another embodiment, the chlorofluorocarbons are selected from the group consisting of dichlorodifluoromethane, chlorodifluoromethane, and a mixture of chlorodifluoromethane and chloropentafluoroethane.

The present invention also contemplates ranges which can include any of the upper limits of the ranges set forth above in combination with any of the lower limits of the ranges set forth above.

As a result of the present invention, unwanted halocarbons can be virtually eliminated and/or significantly diminished while gaining unexpected power efficiencies and moisture removal. Moreover, hydrocarbon replacement in refrigerant systems can be implemented by, e.g., drop in replacement in existing system. And dangers associated with use of hydrocarbons can be removed or reduced by exhausting any hydrocarbon leakage.

For a better understanding of the present invention, together with other and further objects and advantages, reference is made to the following detailed description, taken in conjunction with the accompanying examples, and the scope of the invention will be pointed out in the appended claims. The following detailed description is not intended to restrict the scope of the invention by the advantages wet forth above.

BRIEF DESCRIPTION OF THE DRAWINGS

FIG. 1 is a temperature-pressure curve of a refrigerant of the present invention.

DETAILED DESCRIPTION OF THE INVENTION

The ozone depletion potential (ODP) of a chemical compound is the relative amount of degradation to the ozone layer it can cause, with trichlorofluoromethane (R-11 or CFC-11) being fixed at an ODP of 1.0. Chlorodifluoromethane (R-22), for example, has an ODP of 0.055. CFC 11, or R-11 has the maximum potential to harm the ozone layer amongst chlorocarbons because of the presence of three chlorine atoms in the molecule.

ODP can be estimated from the structure of a given substance. Chlorofluorocarbons have ODPs roughly equal to 1. Brominated substances have usually higher ODPs in range 5-15, because of more aggressive bromine reaction with ozone. Hydrochlorofluorocarbons have ODPs mostly in range 0.005-0.2 due to the presence of the hydrogen which causes them to react readily in the troposphere, therefore reducing their chance to reach the stratosphere. The refrigerants of the present invention have ODPs of 0.

ODP is often used in conjunction with a compound's global warming potential (GWP) as a measure of how environmentally detrimental it can be. GWP is a relative measure of how much heat a greenhouse gas traps in the atmosphere. It compares the amount of heat trapped by a certain mass of the gas in question to the amount of heat trapped by a similar mass of carbon dioxide. GWP is expressed as a factor of carbon dioxide (whose GWP is standardized to 1). For example, the 20 year GWP of methane is 72, which means that if the same mass of methane and carbon dioxide were introduced into the atmosphere, that methane will trap 72 times more heat than the carbon dioxide over the next 20 years.

The substances subject to restrictions under the Kyoto protocol either are rapidly increasing their concentrations in Earth's atmosphere or have a large GWP. The GWP depends on the following factors: 1) the absorption of infrared radiation by a given species, 2) the spectral location of its absorbing wavelengths, and 3) the atmospheric lifetime of the species. Thus, a high GWP correlates with a large infrared absorption and a long atmospheric lifetime. The refrigerants of the present invention have a GWP of 8.

In an embodiment the refrigerants of the present invention include propane and propene, or propylene. In another embodiment the refrigerants of the present invention include propane, propene, or propylene, and butane. In a preferred embodiment the butane is isobutane. In another preferred embodiment, the propane is unrefined propane, or field propane.

It is important for a refrigerant to have a temperature-pressure curve suitable for operation of R-12 equipment. If a temperature-pressure curve is too high, it may result in excessive head pressures, refrigerant breakdown and compressor failures in many instances. A temperature-pressure curve which is too low may result in low system capacities, and causes problems if system low pressure cut out controls are not replaced or adjusted.

With reference now to FIG. 1, a temperature-pressure curve of an inventive refrigerant is shown. A refrigerant mixture composition (Sample No. 2) comprising 51% propane by weight, 8% propene by weight, and 41% butane by weight was made. The consistency shown in the temperature/pressure curve allows the product to work in a energy efficient and moisture reduction manner. Sample No. 2 exhibits a temperature-pressure curve which allows it to be used to reduce energy consumption, reduce wear on moving parts, reduce moisture, while remaining non-corrosive.

The temperature and pressure PSIG meeting points should remain continuous throughout the process of filling the cylinders, thereby mirroring the pressure chart. If the refrigerant pressures and temperatures are not consistent the integrity of the refrigerant could breakdown.

EXAMPLES

The present invention is further exemplified, but not limited, by the following representative examples, which are intended to illustrate the invention and are not to be construed as being limitations thereto.

A refrigerant mixture according to the present invention was made and tested in three refrigeration systems. The results serve to compare the inventive refrigerant mixtures with standard R22 refrigerant energy performance in a side by side study. The testing was performed on air conditioners in a simulated laboratory test, and in a real world side-by-side comparison.

Systems Tested

For the lab tests, integrated testing was performed on a set of two matching direct expansion (DX) units located in the same space in this project. A data acquisition system was installed to monitor and collect data during the field test. For the field testing, two matching roof top units were used serving offices spaces on the same floor of a commercial office building.

Laboratory Test

A laboratory test simulation was performed on two identical DX split units. The heat load was generated in the space with a separate heat source. The room conditions were as follows: Room size: 22'-9" L×20'-5" W×18' H; Ceiling: None installed (exposed/insulated roof deck); Glass: None (no exterior windows); Outside Doors: one metal man door; Outside Walls: one approximately 20'×16'; and interior lighting: approximately 1.25 wpf.

The equipment used in testing was: Quantity two Amana 2-ton air cooled condensing units—R-22; two Amana 2-ton air handlers—R-22; and two Honeywell programmable thermostats.

The test room had one Payne 45,000 btuh warm air furnace to supply sensible heat load into room. An unconditioned warehouse adjacent to the lab space supplied both sensible and latent heat load thru a large transfer grill. Refrigeration piping of identical size and length was used to connect both systems. The condensing units were located on grade side by side immediately outside the space on the North side of the building. The air handlers were located side by side on the inside of the North wall for minimum refrigeration pipe run. Suction and liquid line pressure gauges were installed inside for data monitoring. The air handlers drew air from the testing room across the evaporator coils and discharged the air out of the building. Room air was made up by a transfer opening from adjoining warehouse space. The warehouse space was not conditioned.

Prior to running the tests, the data acquisition M & V sensors were calibrated and verified as accurate. Both units were charged with standard R-22 according to factory procedures. The units were run side by side to establish a baseline and to prove that the units performed identically. The data acquisition system was run during this phase of the testing. The units did draw the same power.

Technicians evacuated unit #1 using standard EPA procedures for refrigerant reclamation. The unit #1 test system was charged with inventive refrigerant mix of the present invention, Sample No. 1, which was 87% propane and 13% propene. A certain amount of the original R22, i.e. 4 lbs 7 oz. was removed. The amount of Sample No. 1 installed was 1 lb. 10 oz. One of the primary reasons for lower energy consumption of the inventive mixtures is the lower gas volume requires less compressor work.

Both units were operated under load and operating parameters were recorded using data acquisition system. On the initial test day the outdoor weather conditions was heavy rain. The high humidity allowed for the testing of moisture removal capacity between the two refrigerants. Simultaneous condensate water collections were taken from both condensate drains. The unit with sample No. 1 discharged 14 fluid ounces of water. The R22 (unit #2) discharged 11 fluid ounces of water. The unit with sample No. 1 removed 27% more moisture from the conditioned air. The test was run for 6 consecutive days with data collection.

The following were metering/monitoring variables of the two HVAC units: (i) Inside Space Temperature; (ii) Outdoor Temperature; (iii) Thermostat settings for each space and unit; (iv) Supply air temperature; (v) Return air temperature; (vi) Total kWH; (vii) Electrical Demand; (viii) Refrigerant Low side pressure; (ix) Refrigerant High side pressure; and (x) Hours of operation.

The energy use resulted in 10% difference of electrical energy used in the refrigerant compression electrical loads between the refrigerant of Sample No. 1 as compared to the standard R22 refrigerant. While fan loads remain constant, the thermodynamic properties improve performance on the air side of the refrigerant cycle with lower evaporation temperatures and higher moisture removal (latent load).

Field Test No. 1

A side-by-side field test of Sample No. 1 and R-22 was conducted. A 75-ton rooftop heat/cool unit was chosen for the test. The unit was a Trane Model # SFHFC754H777C9BD8D11ABCE0G00L00RT0Y8600, Serial # C05B01224. The unit was charged with R-22 refrigerant and was manufactured in 2006. The unit operates with six scroll compressors with circuits #1 and #2. Each circuit consists of one 15-ton and two 10-ton compressors. This unit serves a general office environment of the first floor that was fully occupied. The total area covered of the floor under test was 62,650 sq. ft., with 31,325 sq. ft. served by each RTU. The return air was measured at 74° F. db, the supply air was 55° F. db, and the outdoor temperature was 82° F. db. In this test the entire unit was not shut down in an effort to not cause discomfort to the building occupants. Each circuit was independently shut down and the existing R-22 refrigerant was recovered. Each circuit was evacuated for a period of 45 minutes and Sample No. 1 refrigerant was installed. The amount of existing R-22 recovered was 80 lbs in circuit #1 and 79 lbs on circuit #2. Sample No. 1 installed was 37 lb-6 oz in circuit #1 and 36 lbs-3 oz in circuit #2, both weighed by the same electronic scale. The compressor amperage in circuit #1 while running with the existing R-22 was measured at 26.3, 16.4 and 17.4 respectively on the 460 volt 3 phase circuits. After Sample No. 1 was installed the compressor amperage was measured at 21.1, 13.3 and 13.9 respectively. This was a decrease of over 19%.

The compressor amperage in circuit #2 while running with the existing R-22 was measured at 25.5, 16.9 and 17.2 respectively. After Sample No. 1 was installed the compressor amperage was measured at 21.4, 13.6 and 13.5 respectively. This was a decrease of over 18%. After stabilizing both circuits the supply air temperature leveled off at 52° F. db with a return air temperature of 76° F. db. The supply air temperature of Sample No. 1 was 3° F. lower than the original R22.

The performance of this test unit and a second 75-ton rooftop unit serving the general office area at this location was monitored. The Sample No. 1 test unit serves the south half of the building's first floor and the comparison R22 unit serves the north half of the same floor. The compressor amperage continued to be the same spread of between 15% and 19% throughout the test period of 2 months. The amount of condensate generated was not measured in this test. Note that these 75-ton units are both Variable Air Volume (VAV) units with Variable Frequency Drives. The loads vary due to VAV throttling so the comparative amperage readings were taken during the morning pull-down cycle when the loads were at a maximum.

Field Test No. 2

Another field test was performed on a 5-ton rooftop heat/cool unit. The unit under test was a Rheem Model #RKKA-A060CK13E, Serial #2A5643ADAAF349911631, using R-22 refrigerant and operates on 208 volt 3 phase power, the unit was manufactured in 1999 and uses a scroll compressor. This unit serves a general office environment. The return air was measured as 72° F. db, the supply air was 51° F. db, and the outdoor temperature was 84° F. db.

The unit was shut down and the existing R-22 was recovered. The unit was evacuated for a period of 30 minutes and Sample No. 1 refrigerant was installed. The amount of existing R-22 recovered was 8 lb-0 oz and the Sample No. 1 refrigerant installed was 3 lb-4 oz both weighed by the same electronic scale.

The unit compressor amperage while running with R-22 was measured at 18.5 amps and after Sample No. 1 was installed the compressor amperage was measured at 13.9 amps. This was a decrease in compressor amperage of over 24%. The supply air temperature dropped from 51° F. db to 48° F. db.

The performance of the test unit and a second 5-ton rooftop unit serving the general office area at this location continued to be monitored. The test unit serves the perimeter zone and the comparison unit serves the interior zone. The compressor amperage continued to be the same spread of between 20% and 24% throughout the summer test period of 2 months. In addition, the condensate drain water was measured and there was approximately 25% more moisture being removed by the unit with Sample No. 1.

Thus while there have been described what are presently believed to be preferred embodiments of the invention, those skilled in the art will realize that changes and modifications may be made thereto without departing from the spirit of the invention, and it is intended to claim all such changes and modifications as fall within the true scope of the invention.

What is claimed is:

1. A refrigerant mixture for a refrigeration system comprising from about 45% to about 55% by weight propane, from about 5% to about 11% by weight propene, and greater than about 36% butane by weight.

2. The refrigerant mixture according to claim 1 wherein said mixture comprises from about 48% to about 53% propane by weight, from about 7% to about 10% propene by weight, and from about 37% to about 45% butane by weight.

3. The refrigerant mixture according to claim 1 wherein said mixture comprises about 51% propane by weight, about 8% propene by weight, and about 41% butane by weight.

4. The refrigerant mixture according to claim 1, wherein said mixture comprises 45% to 55% by weight propane, 5% to 11% by weight propene, and greater than 36% butane by weight.

5. The refrigerant mixture according to claim 1, wherein said mixture comprises 37% to 45% butane by weight.

6. The refrigerant mixture according to claim 1, wherein said mixture comprises 45% to 55% by weight propane, 5% to 11% by weight propene, and 37% to 45% butane by weight.

7. The refrigerant mixture according to claim 1, wherein said mixture comprises 48% to 53% propane by weight, 7% to 10% propene by weight, and 37% to 45% butane by weight.

8. The refrigerant mixture according to claim 1, wherein said mixture comprises 51% propane by weight, 8% propene by weight, and 41% butane by weight.

9. The refrigerant mixture according to claim 1, wherein said butane is isobutane.

10. The refrigerant mixture according to claim 1, wherein said propane is unrefined propane.

11. A refrigerant mixture for a refrigeration system consisting of 45% to 55% by weight propane, 5% to 11% by weight propene, and greater than 36% butane by weight.

12. The refrigerant mixture according to claim 11, wherein said mixture comprises 37% to 45% butane by weight.

13. The refrigerant mixture according to claim 11, wherein said mixture consists of 45% to 55% by weight propane, 5% to 11% by weight propene, and 37% to 45% butane by weight.

14. The refrigerant mixture according to claim 11, wherein said mixture consists of 48% to 53% propane by weight, 7% to 10% propene by weight, and 37% to 45% butane by weight.

15. The refrigerant mixture according to claim 11, wherein said mixture consists of 51% propane by weight, 8% propene by weight, and 41% butane by weight.

16. The refrigerant mixture according to claim 11, wherein said butane is isobutane.

17. The refrigerant mixture according to claim 11, wherein said propane is unrefined propane.

18. The refrigerant mixture according to claim 11, wherein said mixture provides increased moisture reduction in a target environment of about 20% as compared to standard R22 refrigerant mixtures.

19. The refrigerant mixture according to claim 11, wherein said mixture provides increased moisture reduction in a target environment of about 30% as compared to standard R22 refrigerant mixtures.

20. A refrigerant mixture for a refrigeration system comprising 51% propane by weight, 8% propene by weight, and 41% butane by weight, wherein said butane is isobutane and said propane is unrefined propane.

* * * * *